(12) United States Patent  
Lönkvist

(10) Patent No.: US 7,410,179 B2  
(45) Date of Patent: Aug. 12, 2008

(54) WALKER DEVICE

(75) Inventor: Torbjörn Lönkvist, Skeppshult (SE)

(73) Assignee: Dolomite AB, Anderstorp (SE)

( * ) Notice: Subject to any disclaimer, the term of this patent is extended or adjusted under 35 U.S.C. 154(b) by 294 days.

(21) Appl. No.: 10/542,746

(22) PCT Filed: Jan. 15, 2004

(86) PCT No.: PCT/SE2004/000032

§ 371 (c)(1),  
(2), (4) Date: Apr. 14, 2006

(87) PCT Pub. No.: WO2004/073578

PCT Pub. Date: Sep. 2, 2004

(65) Prior Publication Data

US 2006/0237935 A1    Oct. 26, 2006

(30) Foreign Application Priority Data

Feb. 24, 2003    (SE)    .................................... 0300477

(51) Int. Cl.  
*B62B 3/02*    (2006.01)

(52) U.S. Cl. ................. 280/47.371; 280/655.1

(58) Field of Classification Search ............. 280/47.34, 280/47.35, 47.36, 47.371, 655, 655.1; 188/176, 188/1.12  
See application file for complete search history.

(56) References Cited

U.S. PATENT DOCUMENTS 4,261,561 A * 4/1981 Ilon ............................ 482/68

6,283,484 B1 * 9/2001 Malmstrom ............ 280/87.041  
6,442,797 B1 * 9/2002 Yang et al. .................. 16/113.1  
6,659,478 B2 * 12/2003 Hallgrimsson et al. ... 280/47.36

FOREIGN PATENT DOCUMENTS

WO    WO-92/06661 A1    4/1992

* cited by examiner

*Primary Examiner*—Christopher Ellis  
*Assistant Examiner*—John D Walters  
(74) *Attorney, Agent, or Firm*—Birch, Stewart, Kolasch & Birch, LLP

(57) ABSTRACT

The invention concerns a device in wheeled walker or rollator, comprising a frame member (2) having a lower end (3), a handle support rod (4) having an upper end (5), a brake-control means (6) arranged at the upper end (5) of the handle support rod, said brake-control means (6) being movable between a neutral position and a brake-application position. The rollator comprises a wheel (7) located at the lower end (3) of the frame member, the distance between said wheel (7) and the brake-control means (6) being changeable, a brake element (8) located adjacent the wheel (7), an upper force-transmission member (9) connected to said brake-control means (6), a lower force-transmission member (10) connected to said brake element (8), and a coupling means (11) for coupling-together said upper and said lower force-transmission members (9, 10). The upper force-transmission member (9) and the lower force-transmission member (10) are arranged to move freely relative to one another, when the brake-control means (6) assumes its neutral position and. The upper force-transmission member (9) and the lower force-transmission member (10) are arranged to be interconnected by means of said coupling means (11), when the brake-control means (6) leaves the neutral position, in response to which braking force is transferred to the brake element (8).

11 Claims, 4 Drawing Sheets

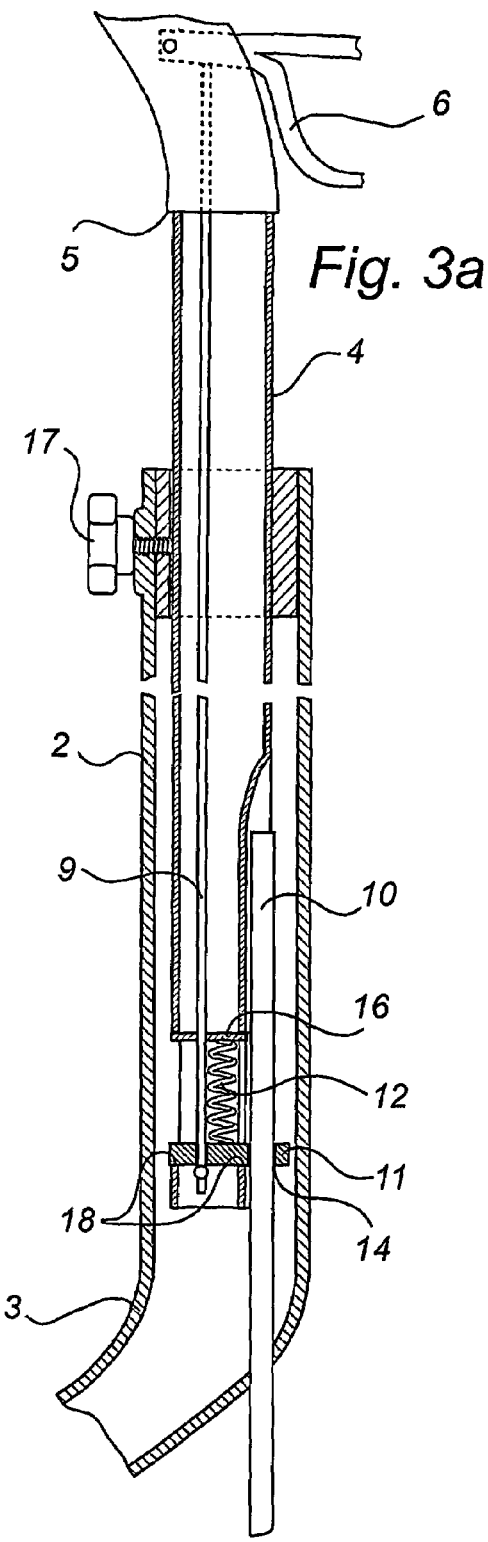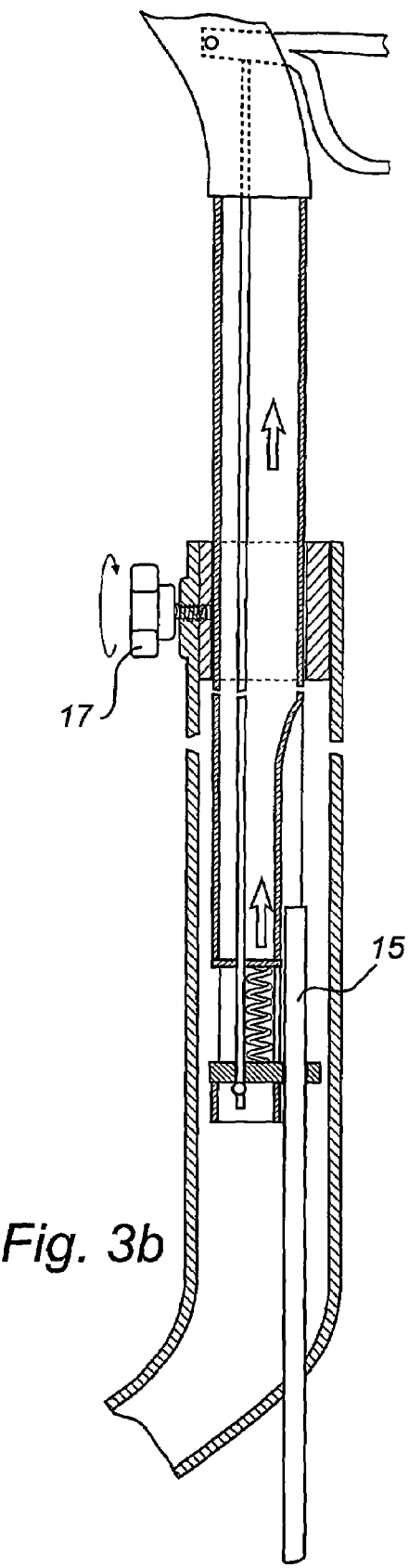

WALKER DEVICE

TECHNICAL FIELD OF INVENTION

The present invention relates to a walker device or rollator, comprising at least one frame member having a lower end, at least one handle support rod having an upper end, a brake-control means arranged essentially at the upper end of the handle support rod, said brake-control means being movable between a neutral position and a brake-application position, a wheel located essentially at the lower end of the frame member, the distance between said wheel and the brake-control means being changeable, a brake element located adjacent the wheel, an upper force-transmission member connected to said brake-control means, a lower force-transmission member connected with said brake element, and a coupling means for coupling-together said upper and said lower force-transmission members.

TECHNICAL BACKGROUND

Walking devices or rollators of the kind outlined above are well known. Rollators of this kind are wheeled devices on which motor-handicapped individuals may support themselves while walking. Such rollators often are adjustable e.g. vertically for adaptation to the height of the user. In addition, rollators conventionally are provided with at least one brake element, which is operated by means of a handle control means, allowing the user to brake the rollator and thus reduce its speed or lock it in the brake-application position. The braking force may be transferred, for example via a brake wire, to a brake means located adjacent the rollator wheel.

The vertical level of the handles including the associated handle control means of the rollator as a rule is adjustable relative to the rollator wheel. The brake wire is often mounted along a part of the external face of the frame to transfer the force from the handle control means to the brake adjacent the wheel.

In rollators of this kind, one consequence of the height-adjustability feature is that the length of the brake wire often constitutes an obstruction to the user.

In order to reduce the problems connected with the height-adjustment arrangement several different solutions have been tested. One solution suggests the use of adjustable rods instead of a brake wire, said rods arranged to be displaced inside the frame between the handle and the wheel in order to thus transfer the braking force. This solution does, however, necessitate adjustment also of the rods in a separate step of the height-adjustment operation, in order to ensure the intended effect of the brake in use.

SUMMARY OF THE INVENTION

One object of the present invention is to provide a rollator, which satisfies the needs for good adjustability of the rollator in combination with satisfactory brake means.

A further object of the invention is that it should be simple and safe. Yet another object of the invention is that it should use few components that could be manufactured at low costs and could be mounted in a smooth and easy manner.

These objects are obtained by arranging in the rollator of the kind outlined above the upper force-transmission member and the lower force-transmission member in such a way that they are allowed to move freely relative to one another when the brake-control means assumes its neutral position and by arranging the upper force-transmission member and the lower force-transmission member such that these members are interconnected by means of the coupling device when the brake-control means leaves the neutral position, in response to which braking force is transferred to the brake element.

When the brake-control means assumes its neutral position, the upper and lower force transmissions members are, for example, adjustable relative to one another. When the brake-control means leaves its neutral position and comes into its brake-application position, braking force may be transmitted between the upper force transmission member and the lower force transmission member as a result of these two members being interconnected and thus transmitting the force from the brake-control means to the brake element.

The upper force transmission member and the lower force transmission member preferably are arranged for stepless adjustment relative to one another in the vertical direction, for example automatically and in synchrony, upon any change of the distance between the wheel and the brake-control means.

The advantage gained by this arrangement is that the rollator may be adjusted vertically. In addition, the adjustment may be achieved simultaneously and continuously while the desired braking function of the rollator is maintained.

The transmission of force between the upper and lower force transmission members preferably is achieved by friction. In addition, the coupling means may be e.g. a plate allowing free passage therethrough of the lower force transmission member, and said coupling means is arranged to be frictionally locked to the lower force transmission member as a result of its assuming an oblique position relative to said member as the brake-control means leaves its neutral position. By frictional locking should be understood primarily that the coupling means is adapted to engage the lower force transmission member with the aid of the frictional force generating between their contacting faces, which ensures that the force transmission may be achieved in a simple and safe manner.

The plate is question preferably is arranged in abutment against e.g. a support means on the handle-support rod, and the upper force transmission member is coupled to the plate in a force-transmitting fashion. Thus, the braking force may be transmitted in a safe and simple manner.

The coupling means may e.g. be spring-biased in the direction towards its neutral position. This allows easy adjustment of the rollator, when the coupling means assumes its neutral position.

The coupling means, the upper force transmission member and the lower force transmission member are at least partly housed inside the frame member and the handle support rod.

As a result, these components are protected against dirt and wetness, since they are at least partly enclosed. In addition, this arrangement also eliminates any risks of injuries to the user of the rollator caused by squeezing between any one of said components.

The lower force transmission member preferably is in the shape of a rigid rod, at least in its coupling part. The rigid rod, which travels e.g. through the coupling means, thus is able to transfer the braking force in a simple and safe manner, when the brake-control means leaves its neutral position. In addition, the rigid rod facilitates the vertical adjustment of the rollator.

In accordance with one particular embodiment, the coupling means may be configured in such a manner that its very shape causes it to be locked to the lower force transmission member when the brake-control means leaves its neutral position. By such shape-induced locking should primarily be understood force transmission between the coupling means and the lower force transmission member caused by shape.

This shape-induced locking feature provides reliable transmission of force between the upper and lower force transmission members.

BRIEF DESCRIPTION OF THE DRAWINGS

The invention will be described in the following in more detail with reference to the accompanying drawings which for exemplifying purposes show preferred embodiments of the invention. In the drawings:

FIG. 3a is a schematic vertical sectional view of a part of a rollator, in neutral position, in accordance with one embodiment of the invention.

FIG. 3b is a schematic vertical sectional view of a part of a rollator in accordance with FIG. 3a while in height-adjustment position.

FIG. 4c is a more detailed view of a part of the rollator of FIG. 4a.

DETAILED DESCRIPTION OF PREFERRED EMBODIMENTS

Figure 1:
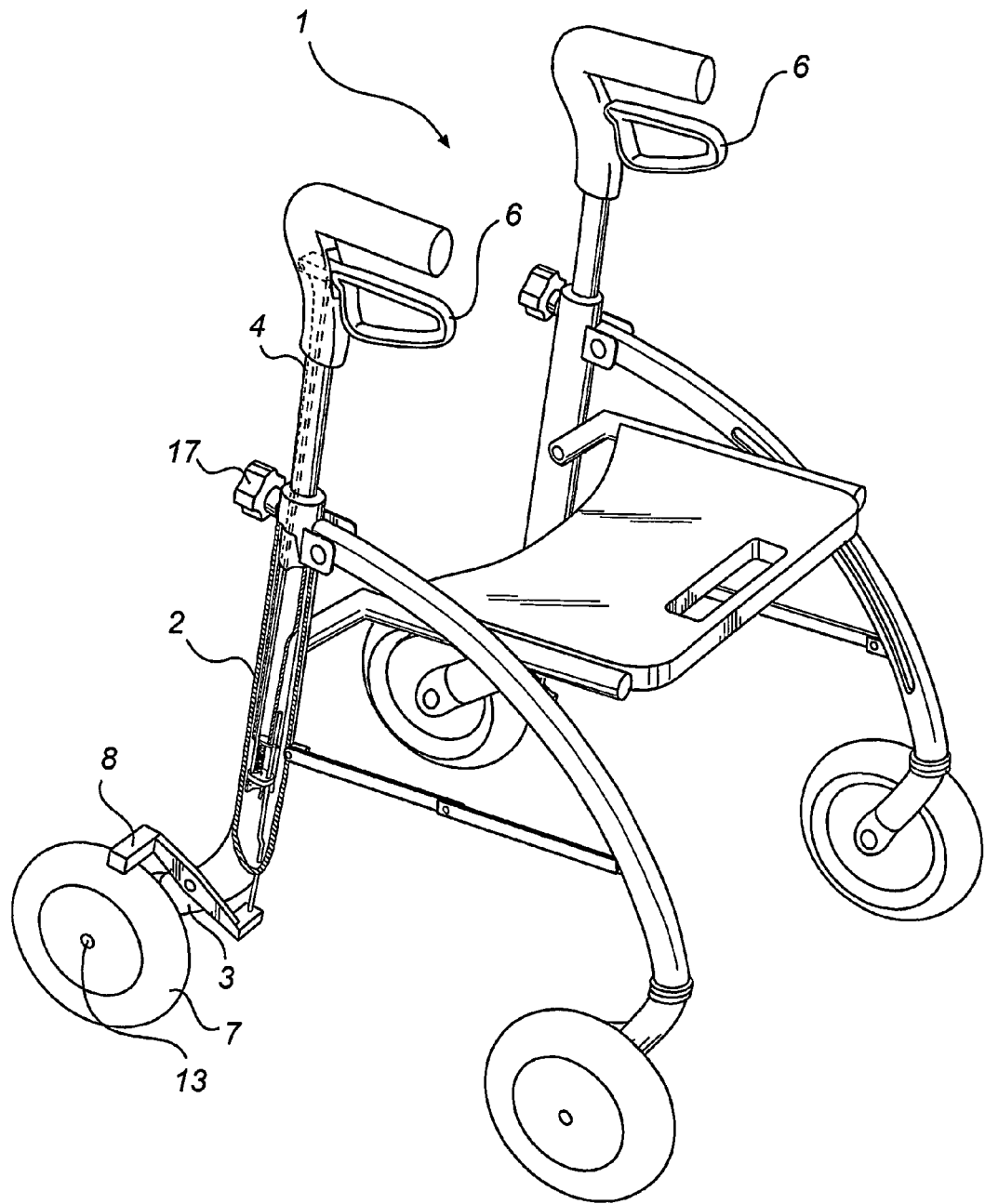
FIG. 1 is a schematic, partly sectional view of a rollator, in accordance with a presently preferred embodiment of the invention.

FIG. 1 shows a rollator 1 in accordance with one embodiment of the invention, which rollator comprises a frame member 2. The lower end 3 of the frame member supports a wheel 7, which is rotatably mounted on a wheel axle 13 in the frame. The lower end 3 of the frame member 2 also supports a brake element 8, which is mounted adjacent the wheel 7 at a predetermined radial distance from the latter.

The upper end of the frame member 2 is provided with an adjustable handle support rod 4. Preferably, the frame member 2 is adapted to receive the handle support rod 4 such that the latter may be fitted into a part of the frame member 2. Suitably, the respective interconnection parts of these components have essentially similar complementary cross-sectional shapes, such as circular, oval or polygonal. In accordance with the embodiment shown in FIG. 1, the lower end of the handle support rod 4 is slightly narrower than the rest of the rod over part of its extension. This narrower part of the handle support rod 4 could for example bulge inwards peripherally and have a half-moon shaped cross-sectional configuration.

Figure 2:
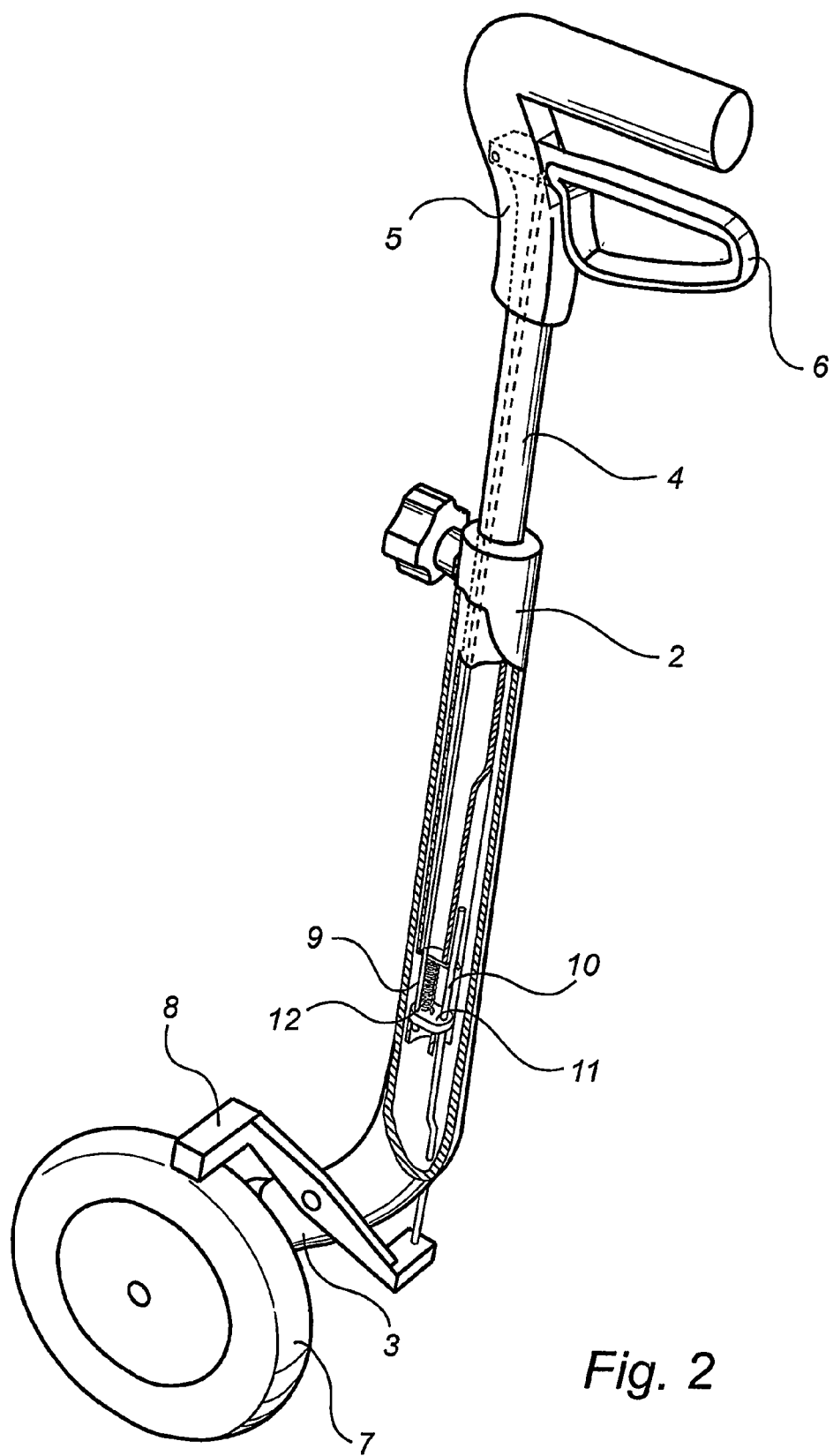
FIG. 2 is a schematic, more detailed view of a part of the rollator of FIG. 1.

With reference to FIG. 2, which shows a part of a rollator 1 in accordance with FIG. 1, the handle support rod 4 is fitted at its the upper free end 5 with a brake-control means 6, such as a brake lever. The brake-control means 6 is connected to the upper end of an upper force transmission member 9, which preferably is accommodated inside the handle support rod 4. In accordance with FIG. 3a, the lower end of the upper force transmission member is connected to a coupling means 11 in a motion-transmission manner. This coupling means 11 preferably is in the form of a plate, preferably fitted with a spring 12. The lower end of the spring is connected to the plate and the upper spring end is connected to the lower part of the handle support rod 4, for example via a support washer 16.

Again with reference to FIG. 2 and to FIG. 3, a lower force transmission member 10 is associated with the coupling means 11 through which it is arranged to pass freely, and preferably it is accommodated inside the frame member 2. Preferably, the coupling means 11 is formed with an aperture 14, alternatively with a recess, for passage-through of the lower force transmission member. The lower end of the lower force transmission member 10 is also connected to the brake element located adjacent the wheel 7. The lower part of the handle support rod 4, which could have e.g. a half-moon shaped cross-section or alternatively it could be formed with an inwardly curved face so as to accommodate the lower force transmission member 10. In accordance with the presently preferred embodiment, the lower force transmission member 10 is located between the lower part of the handle support rod 4 and the inner face of the frame member 2.

The upper and the lower force transmission members 9, 10 preferably are manufactured from rigid rods, for instance of metal. Obviously, these elements could also be made from other materials and in other shapes. The upper force transmission member and the parts of the lower force transmission member that are not directly connected to the coupling means could, in the area of a coupling part 15, instead be in the form of a steel wire or an equivalent means. Other possible materials are plastics or composite materials exhibiting properties that are in accordance with the intentions of the invention.

The plate 11, which preferably has a washer-like configuration of adapted thickness, extends in a so-called neutral position, relative to its longitudinal extension, essentially crosswise relative to the lower force transmission member 10. Again with reference FIG. 3a, the plate 11, when in the neutral position, preferably rests on a bearing means 18 arranged at the lower end of the handle-support rod. The upper force transmission member 9 preferably extends laterally of the spring at an adapted space therefrom, thus forming a torque arm. It should be noted that the plate 11 preferably does not occupy the entire available space between the peripheral parts of the plate and the inner face of the frame member 2.

The function of the rollator will be described in the following with reference to FIGS. 3a, 3b, 4a, 4b and 4c.

The brake-control means 6 is movable between at least two positions, a neutral position and a brake-application position, respectively. The brake-control means 6 could assume one further position, a parking brake-application position, not shown, described more closely in Applicant's Swedish Patent SE 500 410. The parking brake-application position causes the brake-control means to assume a remaining brake-application position. The parking brake-applcation position remains until the user actively operates the brake-control means into another position.

When the rollator assumes the neutral position, as shown in FIG. 3a, the plate 11 rests on the bearing means 18, the spring 12 together with the support washer 16 retaining the plate 11 in neutral, such that the plate extends for instance essentially crosswise relative to the lower force transmission member 10. The lower force transmission member 10 passes freely relative to the aperture 14 in the plate in the neutral position of the latter. Consequently, in this neutral position no force will be transferred between the force transmission members 9, 10.

Reference is made to FIG. 3a as also to FIG. 3b, wherein the vertical adjustment of the handle support rod is illustrated. When the user wises to adjust the distance between the wheel 7 and the brake-control means 5, he loosens the rotary lock knob 17. This allows vertical adjustment of the handle support rod, as illustrated in FIG. 3b, showing raising of the handle support rod to a higher level. Lowering of the rod is effected in a similar and corresponding manner, for which reason this function will not be illustrated or described herein.

During the vertical adjustment operation, the coupling means 11 is in neutral and preferably the brake-control means 6 is not actuated. The handle support rod 4 including the upper force transmission member and the coupling means associated therewith thus are free to be displaced vertically relative to the frame member 2 and the lower force transmission member 10. The lower force transmission member 10 allows vertical displacement of the coupling means 11, because the coupling means 11, when in its neutral position, allows free sliding motion of the lower force transmission member relative to the aperture 14 in the coupling means 11. Adjustment of the handle support rod is possible along a distance corresponding to the extension of the coupling part 15 of the lower force transmission member 10.

When the level of the handle support rod has been adjusted to the desired height, the rotary lock knob 17 is tightened, thus effecting locking-together of the handle support rod 4 and the frame member 2 so as to prevent unintentional height displacement.

Figure 4A:
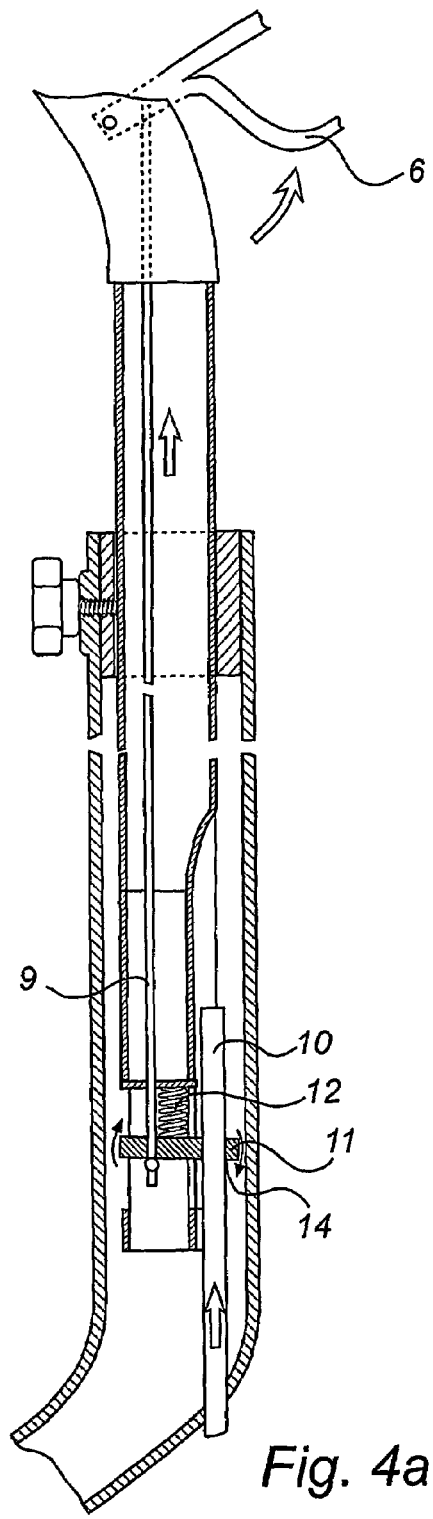
FIG. 4a is a schematic vertical sectional view of a part of a rollator, while assuming a brake-application position, in accordance with one embodiment of the invention.
Figure 4B:
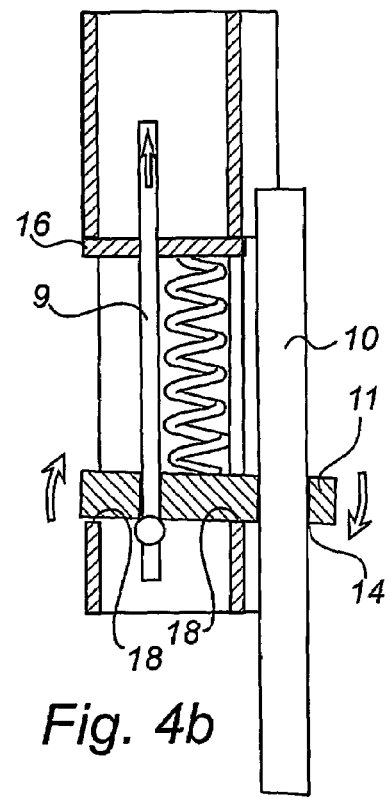
FIG. 4b is a more detailed view of a portion of the rollator in FIG. 4a in an initial stage of a brake-application position.
Figure 4C:
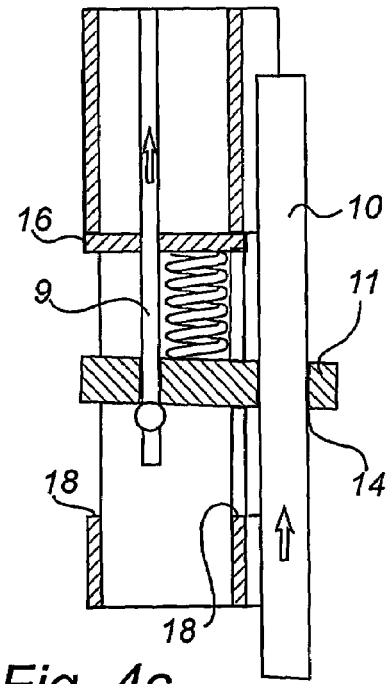

Reference is again made to FIG. 3a but also to FIGS. 4a, 4b and 4c, respectively, showing a brake-application situation. When the rollator user wishes to brake the rollator he may actuate the brake-control means 5 with a force acting in the direction of the arrow shown in FIG. 4a. As a result of this actuation, the brake-control means 6 will leave its neutral position and the force will be transferred to the upper force transmission member 9 via the brake-control means 6. The force is transferred to plate 11 at the lower end of the upper force transmission member 9. The force acts on the plate 11, causing the latter to tilt or assume an oblique position relative to the lower force transmission member 10, whereby initially the plate 11 will lose contact with only one part of the bearing means 18, as seen in FIG. 4b.

The force acting on the plate must, however, exceed the spring force of spring 12, which otherwise maintains the plate 11 in abutment against the bearing means 18 in the neutral position thereof. Upon tilting of the plate 11 the lower force transmission member 10 is locked in abutment against the aperture 14 in the plate, preferably by means of friction. The vertical movement of the obliquely-positioned plate 11 will result in the latter ultimately disengaging itself entirely from any parts of the bearing means 18 and in consequence thereof the force from the upper force transmission member 9 will be transferred, whereby the lower force transmission member 10 preferably performs an essentially vertical movement, as seen in FIG. 4c. The lower force transmission member 10 in turn actuates the brake element 8, which brakes the wheel 7.

In accordance with a particular embodiment, not shown, force transmission between the coupling means 11 and the lower force transmission member 10 could be effected by other types of shape-induced force-transmission means, such as inter-fitting locking means. Such force transmission could of course be achieved in a number of other ways and also in combination with one or several of the following interconnection or locking methods, e.g. splines, wedges, pressure-exerting means, clamping members and shrink-fitting means.

As will be appreciated, numerous expert modifications and variations of the above-described embodiment of the invention are possible within the scope of protection of the invention as the latter is defined in the appendant claims. For example, by comparatively simple means the above-described rollator 1 could be adapted for attachment of the coupling means 11 to the lower force transmission member 10 instead.

In addition, the rollator components could be made from other materials, such as plastics, composite materials or other materials possessing the properties required to meet the object of the invention.

The parts of the coupling means surrounding the aperture 14 and/or the lower force transmission member could also be formed with a rough surface in such a manner furthering force transmission. In addition, these surfaces could be provided with some kind of grooves or channels that thus co-operate and effect the force transmission upon actuation.

In addition, the coupling means 11 could consist of several parts, either in the form of separate or joined-together components.

In addition, the coupling means, the upper and the lower force transmission members obviously could at least partly be located on the external face of the handle support rod 4 and the frame member 2. Should in this case these components in any way abut superficially against the handle support rod 4 and/or the frame member 2 they may at least partly be enclosed in some protective cover or alternatively in a protective sleeve.

LIST OF NUMERAL REFERENCES 1. walker device, rollator
2. frame member
3. lower end of frame member
4. handle support rod
5. upper end of handle support rod
6. brake-control means
7. wheel
8. brake element
9. upper force-transmission member
10. lower force-transmission member
11. coupling means; plate
12. spring
13. wheel axle
14. aperture
15. coupling part
16. support washer
17. rotary lock knob
18. bearing means

The invention claimed is:

1. A device in a wheeled walker or rollator, comprising at least one frame member (2) having a lower end (3), at least one handle support rod (4) having an upper end (5), a brake-control means (6) arranged essentially at the upper end (5) of the handle support rod, said brake-control means (6) being movable between a neutral position and a brake-application position, a wheel (7) located essentially at the lower end (3) of the frame member, the distance between said wheel (7) and the brake-control means (6) being changeable, a brake element (8) located adjacent the wheel (7), an upper force-transmission member (9) connected to said brake-control means (6), a lower force-transmission member (10) connected to said brake element (8), and a coupling means (11) for coupling-together said upper and said lower force-transmission members (9, 10), characterised in that the upper force-transmission member (9) and the lower force-transmission member (10) are arranged to move freely relative to one another, when the brake-control means (6) assumes its neutral position and that the upper force-transmission member (9) and the lower force-transmission member (10) are arranged to be interconnected by means of said coupling means (11), when the brake-control means (6) leaves the neutral position, in response to which braking force is transferred to the brake element (8).

2. A device as claimed in claim 1, characterised in that the upper force-transmission member (9) and the lower force-transmission member (10) are adjustable relative to one another vertically.

3. A device as claimed in claim 1, characterised in that the upper force-transmission member (9) and the lower force-transmission member (10) are adjustable relative to one another in the vertical direction, automatically and in synchrony upon any change of the distance between the wheel (7) and the brake-control means (6).

4. A device as claimed in claim 1, characterised in that the upper force-transmission member (9) and the lower force-transmission member (10) are adjustable relative to one another in the vertical direction in a stepless fashion.

5. A device as claimed in claim 1, characterised in that the transmission of force between the upper and lower force-transmission members (9, 10) is achieved by friction.

6. A device as claimed in claim 1, characterised in that the coupling means (11) is a plate allowing free passage therethrough of the lower force-transmission member (10), said coupling means (11) arranged to be frictionally locked to the lower force-transmission member (10) or, inversely, as a result of said plate assuming an oblique position relative to said latter member, when the brake-control means (6) leaves its neutral position.

7. A device as claimed in claim 6, characterised in that said plate (11) is arranged in abutment against the handle support rod (4) and in that said upper force-transmission member (9) is coupled to the plate (11) in a force-transmission fashion.

8. A device as claimed in claim 1, characterised in that the coupling means (11) is spring-biased towards its neutral position.

9. A device as claimed in claim 1, characterised in that the coupling means (11), the upper force-transmission member (9), and the lower force-transmission member (10) are at least partly accommodated inside the frame member (2) and the handle support rod (4).

10. A device as claimed in claim 1, characterised in that the lower force-transmission member (10) is in the shape of a rigid rod, at least in the area of its coupling part (15).

11. A device as claimed in claim 1, characterised in that the shape of the coupling means (11) causes it to be locked to the lower force-transmission member (10), when the brake-control means (6) leaves its neutral position.

* * * * *